Feb. 9, 1943.   R. J. ROBINSON   2,310,600
ILLUMINATED SIGN
Filed Feb. 17, 1941

INVENTOR:
RAY J. ROBINSON,
BY
ATTORNEY.

Patented Feb. 9, 1943

2,310,600

UNITED STATES PATENT OFFICE 2,310,600

ILLUMINATED SIGN

Ray J. Robinson, Los Angeles, Calif.

Application February 17, 1941, Serial No. 379,189

3 Claims. (Cl. 240—106)

This invention relates to illuminated signs, and particularly to novel light reflecting means therefor.

At the present time, most illuminated signs utilize some form of gas, such as neon, and in some instances signs utilize a series of lenses adapted to outline or form a configuration on a suitable panel, with illuminating means rearward of the panel, the said lenses acting as light transmitting members so as to glow forwardly of the panel.

My invention contemplates improvements in the use of lenses for outlining an object on a panel or for forming letters, as the case may be. Devices of this character are relatively cheap, easily installed, not subject to deterioration, and provide a pleasing appearance comparable to the best type of neon signs, and sometimes superior thereto. From an economy standpoint, the lens form is superior to neon in that isolated zones of light may be provided rearwardly of a panel with resultant cheapness of operation. Breakage that may occur will occur in the electric light bulb which will simply need replacing, whereas if a neon tube is broken, considerable expense is entailed in its replacement.

An object of the present invention is to provide a lens which when viewed at any angle appears brilliantly illuminated and without any dead spots.

Another object is the provision of a lens which will always appear brilliant when illuminated, and regardless of dust, dirt, smoke, accumulation of moisture, or the like, on the surfaces thereof.

Another object is the provision of a lens for illuminated signs so constructed and arranged as to give a triple illuminating effect.

Another object is the provision of a lens wherein different colored effects are obtainable when the lens is illuminated, either by an artificial or by a natural light.

Another object is the provision of a lens which appears brilliant in daylight so as to render any sign to which the same is applied immediately visible, attention compelling, and generally attractive.

Another object is the provision of a lens wherein various variegated color effects may be incorporated in a novel and inexpensive manner.

Another object is the provision of a lens so constructed and arranged that the same may be quickly applied to a panel and locked to said panel without fear of the lens dropping therefrom.

In the simplest embodiment of the invention, I have provided a lens which may be formed of various materials, such as from a plastic, the said plastic being either transparent or translucent. The said lens includes a head provided with facets, a shank rearward of the head, preferably tubular or annular in form, with the exterior surface of said shank formed with a feather or key which is frangible. This key and said shank may be moved through an opening in a panel and when the lens is turned, the key or feather is broken so as to provide an abutment rearwardly of the panel to lock the said lens in said panel. In addition, the exterior surface of the head of the lens is provided with facets, while a portion of the lens head, commonly called the "pavilion" is provided with facets incorporated within the confines of the tubular shank. Light in passing through the shank contacts the facets of the pavilion and is reflected within the head, striking the main facets with resultant further reflection. To get color effect in the lens, I provide plugs within the annular shank of different colors.

Other objects of the invention comprises a lens which is simple in construction, economical in cost of manufacture, and generally superior to devices of this character now known to the inventor.

With the above mentioned and other objects in view, the invention consists in the novel and useful provision, formation, construction, association, and relative arrangement of parts, members and features, all as shown in certain embodiments in the accompanying drawing, described generally, and more particularly pointed out in the claims.

Figure 3:
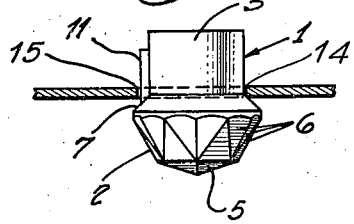
Figure 4:
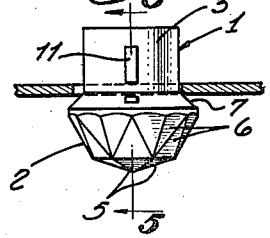
Figure 5:
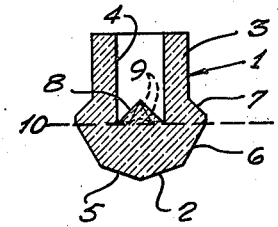
Figure 6:
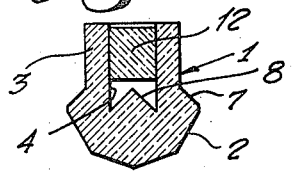
Figure 7:
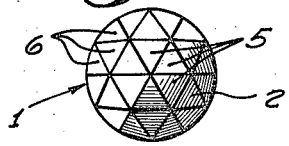
Figure 8:
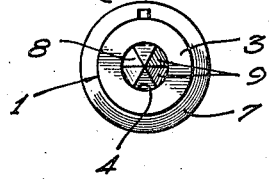

Figure 3 is an enlarged view of one of the lenses incorporating the invention incorporated in a panel, Figure 4 is a view similar to Figure 3, the lens being rotated 90° from the showing of Figure 3, Figure 5 is a sectional view on the line 5—5 of Figure 4, Figure 6 is a vertical sectional view of a modified form of the lens, Figure 7 is a plan view of the head of the lens, and, Figure 8 is an end elevation of the lens shown in Figures 3 to 5, inclusive.

Referring now with particularity to the drawing, the improved lens is designated as an entirety by the numeral 1 and the same includes a head 2, and shank 3. The head is of larger diameter than the shank, and the shank is preferably tubular or annular in form, which is to say, provided with a central bore 4.

I have found it expedient although not entirely essential to provide the facet structure shown in the drawings for the head. This facet structure resembles to a certain extent so-called Twentieth Century cut for diamonds and precious stones, in that a pyramidal range of facets is provided at 5, and main facets at 6. A circular inclined face 7 may be provided at the juncture of the facet 6, with the periphery of the shank 3. The pavilion 8 extends within the bore 4 of the shank, as illustrated in Figure 5. This pavilion is provided with the usual facets 9. The girdle may, therefore, be considered as being in the transverse plane indicated by the dotted line 10 of Figure 5.

Formed on the periphery of the shank 3 and extending from the surface 7 is a longitudinal feather or key 11. This feather or key is preferably formed of the same material as the lens and is frangible in nature. To this end, as before stated, the lens is preferably of plastic material, which may be transparent or translucent. Such material, while frangible, does not splinter in the sense that glass splinters.

In Figure 6, I have provided a plug 12 within bore 4 of the shank. This plug may be of any color—for instance, red, green, blue, yellow, etc. Hence, if the lens is constructed of a clear material say, white, the plug 12 within the shank, may be green, red, or blue, with the result that when the lens is illuminated a scintillating color effect is produced.

Figure 1:
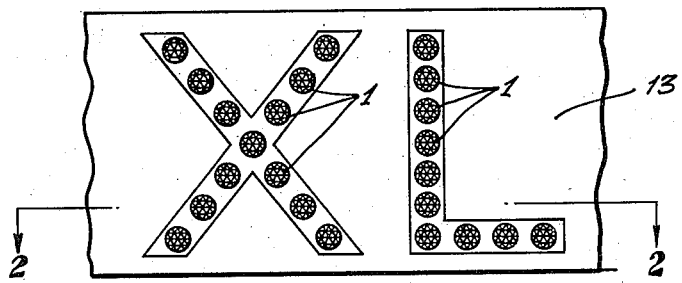
Figure 1 is a fragmentary elevation of a sign incorporating the invention.
Figure 2:
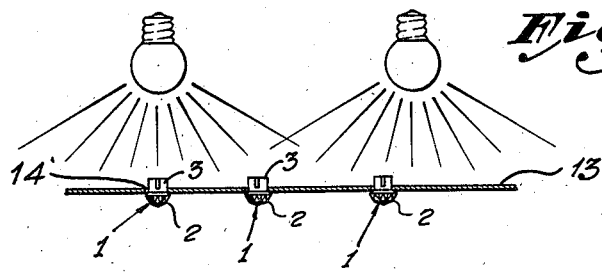
Figure 2 is a sectional view on the line 2—2 of Figure 1.

Referring specifically to Figures 1 and 2, it is intended that a series of lenses should be used to outline or form some configuration or character; for instance, the letters XL. In Figure 1, the lenses are centrally disposed within the letters, and when some source of illumination, such as the electric light bulbs shown in Figure 2, are energized, the lenses which act as light transmitting members will glow, and if plugs of the type shown in Figure 6 and previously described are utilized, the characters of the sign appear to be brilliantly illuminated in different colors.

The panel 13 may be formed of sheet metal and is provided with bores 14 to accommodate the lens shanks. There is also provided in said panel key-ways 15, whereby the key or feather 11 of each lens may be accommodated within the key-way, as see Figure 3. When a lens is revolved from the position of Figure 3 to that of Figure 4, the said key or feather 11 is cut or sheared transversely by the panel so as to lock the lens to said panel and in position of service (see Figure 4). It is immediately apparent why the key or feather 11 must be of a frangible material and of the type that does not split or entirely break off, when subjected to shearing. A properly formed plastic functions satisfactorily in this particular.

The operation, uses and advantages of the invention are undoubtedly understood from the description as given, and it may be pointed out that a lens of the character depicted may be readily molded, with the result that said lenses may be formed quite cheaply, with resultant low cost to the ultimate consumer. Furthermore, by following the construction of the lens as described and shown, the observer may view a sign incorporating said lenses from any angular position without any lessening of brilliant lighting effect. When plugs 12 of the character shown in Figure 6 are incorporated, the lenses appear to glow in different colors, as different angular observations are made by the observer. There are no dead light portions on the lenses, and whether the lenses are illuminated by the source of illumination as shown in Figure 2, or viewed in sunlight, the lenses still glow. Thus, a device of this character is useful for road signs, on automobiles as a warning signal; in fact, on vehicles of any form, and whether illuminated from the front or from the rear of said lenses. The facets are preferably smooth and polished, with the result that dirt does not readily accumulate thereon, such as would be the case if an unsmooth surface were provided, or if said surface was sandblasted or pitted.

I claim:

1. A lens for illuminated signs comprising a light transmitting body having a head provided with a pyramidal range of exterior facets and central set of main facets, a tubular shank extending rearwardly from said head, a faceted pavilion rising from the rear face of said head and extending rearwardly within the confines of said shank to provide oppositely arranged reflecting surfaces with respect to the exterior facets on the head, and a light transmitting plug of a contrasting color to the body arranged in the bore of said shank.

2. A lens for illuminated signs comprising a light transmitting body having a head with oppositely arranged exterior and interior facets, a tubular shank extending rearwardly from said head, and a light transmitting plug of a contrasting color to the body arranged in the bore of said shank and terminating adjacent the interior facets.

3. The combination with a panel provided with a circular opening and key-way, of a lens provided with a head and circular shank, a frangible longitudinally extending key of plastic material on said shank, said shank and its key being adapted to be passed through the circular opening and key-way in said panel and when turned to cut a groove in the plastic key the thickness of the panel to lock the lens thereto.

RAY J. ROBINSON.